UNITED STATES PATENT OFFICE.

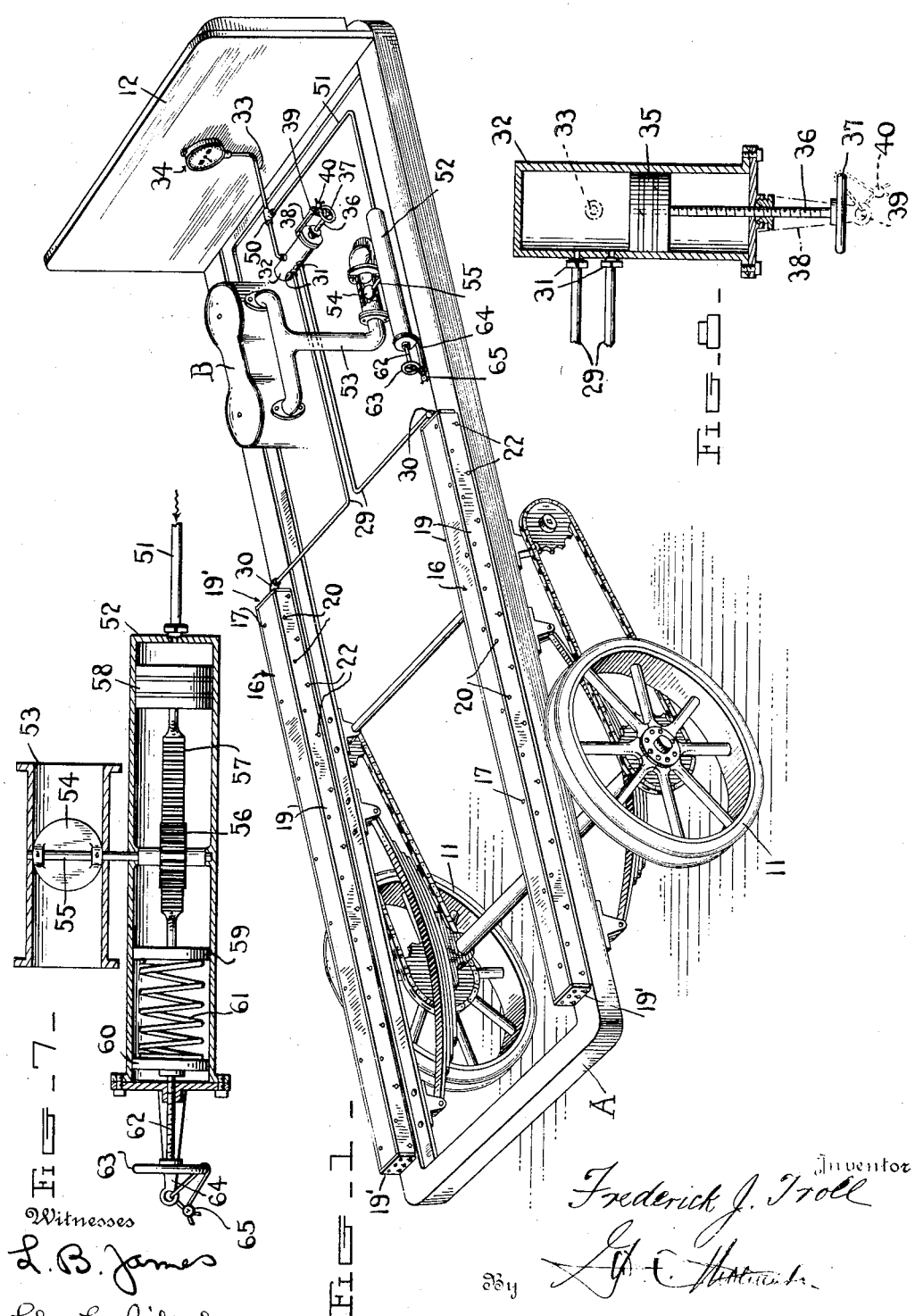

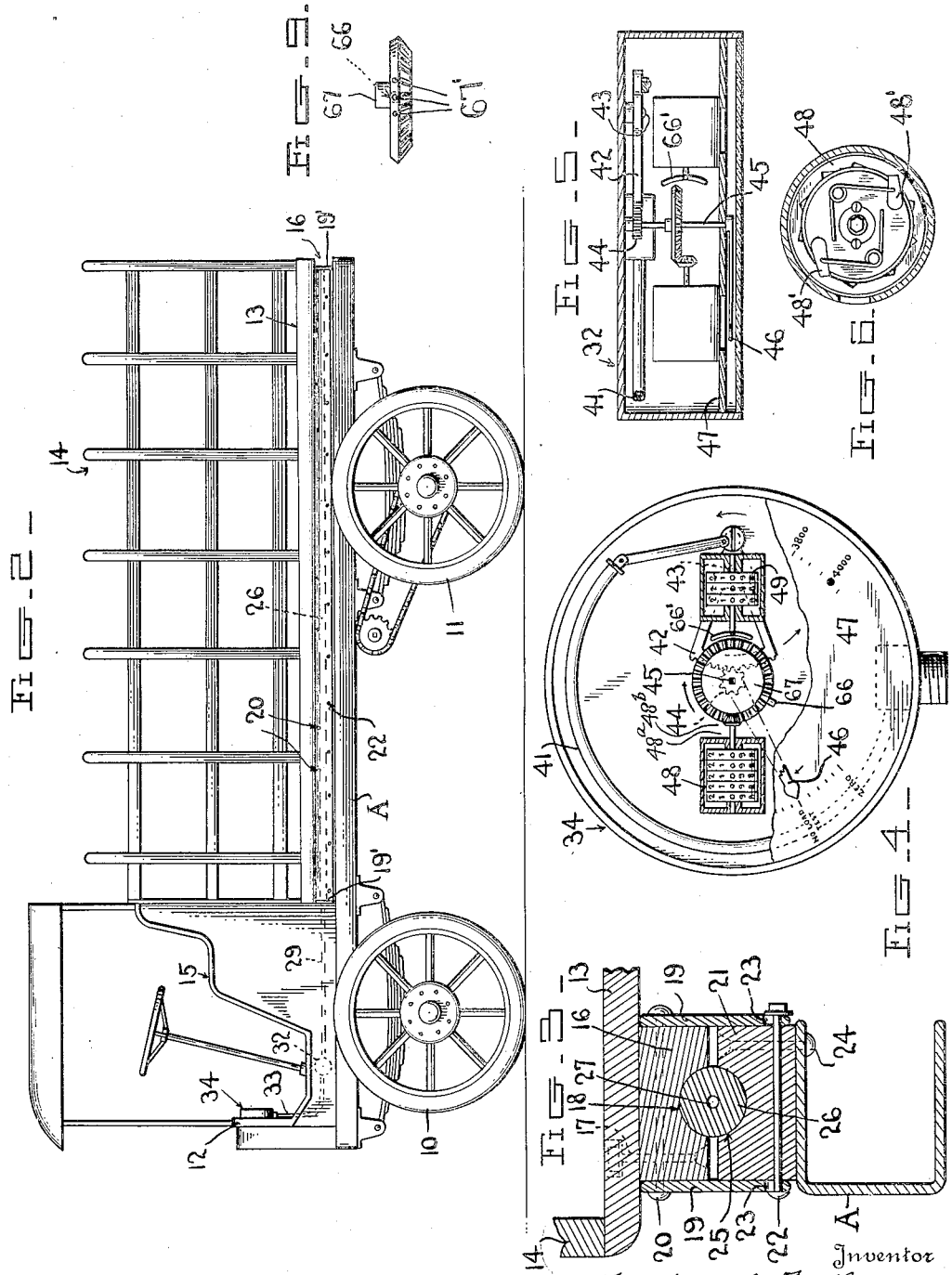

FREDERICK J. TROLL, OF BALTIMORE, MARYLAND, ASSIGNOR TO THE LOADOMETER COMPANY, OF BALTIMORE, MARYLAND, A CORPORATION OF DELAWARE.

LOAD-INDICATOR FOR MOTOR-VEHICLES AND THE LIKE.

1,227,503.  Specification of Letters Patent.  Patented May 22, 1917.

Application filed December 14, 1914. Serial No. 877,226.

*To all whom it may concern:*

Be it known that I, FREDERICK J. TROLL, a citizen of the United States, residing at the city of Baltimore, State of Maryland, have invented certain new and useful Improvements in Load-Indicators for Motor-Vehicles and the like, of which the following is a specification.

This invention relates to a load indicator for motor trucks or the like, and may be termed a loadometer.

Motor trucks are sometimes equipped with a sign disposed at some convenient point on the vehicle to indicate the pound capacity thereof. Warnings are also sometimes located on the vehicle to the effect that it should not be loaded to an extent beyond its rated carrying capacity, say for instance 3,000 pounds. The reason for such notices and warnings is that overloads place the truck under unnecessary strain and impair the life of the truck. A cautious driver, in some instances, in his efforts to exercise extreme care may underload the truck thereby reducing the operative efficiency by increasing the unit cost per pound of the materials handled. Careless drivers are likely to overload the truck, thereby increasing the repair cost, tire expense, etc., with the result that from the manufacturer's viewpoint, the reputation of the truck is affected to the disadvantage of the manufacture by reason of complaints from owners or purchasers of motor trucks.

It is therefore one object of my invention to provide a means particularly adapted for application to motor trucks to indicate underloads and overloads in units of two hundred pounds more or less so that the rated capacity of the truck will not be abused or the operating efficiency reduced because of failure to load the truck to its rated capacity.

Another object resides in the provision of a fluid pressure means which may be readily applied to a motor truck and which will effectively operate so that the full load may always be carried and an underload or overload always known to the driver or other attendant.

Another object resides in the provision of an appliance readily applicable to a motor vehicle or other truck which embodies among other characteristics means whereby the total pounds handled may be indicated and when the weight capacity of the vehicle has been reached indication thereof may be made as may also an indication given of the number of times the vehicle has been overloaded.

A still further object is to provide a motor truck or other vehicle with means for indicating the loads placed upon and carried by the same in conjunction with means associated therewith to prevent the supply of driving medium to the engine of a motor truck when a predetermined point beyond the rated load capacity has been reached to avoid damage to the truck.

Another object resides in the provision of an upper load carrying member and a lower member between which is arranged a fluid containing operating compressible load supporting member adapted to operate a load indicating means and constructed to support the load independently of the presence of fluid therein.

It is still further designed to provide resilient or other shock absorbing elements between the chassis frame and body of the truck to reduce the amount of vibration and shocks to the metal parts of the chassis which latter in time is subject to crystallization.

With the above and other objects in view, the present invention consists in the combination and arrangement of parts hereinafter more fully described, illustrated in the accompanying drawings, and particularly pointed out in the appended claims, it being understood that changes may be made without departing from the spirit or sacrificing any of the advantages of the invention.

In the drawings:

Figure 1 is a perspective view of the invention illustrating a portion of a vehicle showing my invention applied thereto.

Fig. 2 is a side elevation of a vehicle illustrating the application of my invention thereto.

Fig. 3 is a fragmentary transverse sectional view through one side of the vehicle illustrating a portion of my invention in section.

Fig. 4 is an elevation of the gage with a part of the dial broken away.

Fig. 5 is a horizontal sectional view through the gage.

Fig. 6 is a transverse sectional view through one of the registering mechanisms illustrating one means for preventing backward movement of the registering disks.

Fig. 7 is a horizontal sectional view through a portion of the manifold intake pipe and the mechanism which is operated to automatically cut off the supply of gas to the engine, if a gasolene engine be employed for driving the vehicle.

Fig. 8 is a horizontal sectional view through the means for automatically varying or adjusting the capacity of the fluid operating means.

Fig. 9 is a detail view of the driving gear of the gage illustrating the means for adjustably positioning the trip arm.

Referring now more particularly to the accompanying drawings, the reference character A indicates the frame of the chassis of a motor or other truck which is supported upon front and rear wheels 10 and 11 in the usual or any suitable manner and to which the dash 12 may be secured.

The character 13 indicates the platform or bottom of the body 14 which truck body usually extends from the rear of the driver's seat 15 to the rear of the frame A.

Secured adjacent opposite side edges of the underside of the bottom 13 of the truck are oppositely disposed upper sills 16. Any suitable securing means may be employed for this purpose but bolts 17 are effective for the purpose. These sills 16 preferably extend from the rear of the driver's seat to the rear end of the truck. In each sill there is formed a substantially semi-circular or other form of longitudinal groove 18, extending throughout the length of each sill 16.

Plates 19 are secured by means of bolts or other suitable elements 20 to the sides of each sill 16 and depend below the respective sills. The plates 19 are thus arranged in pairs, a pair being secured to each sill 16.

Fitted between each pair of plates 19 is a lower sill 21, which is preferably of the same length as the corresponding upper sill 16 and which is supported for vertical movement between the corresponding pair of plates 19 by means of bolts or other suitable elements 22 passing transversely therethrough and having movement at their ends in slots 23 formed at the lower edge of the plates 19. These lower sills 21 are secured by means of bolts or other suitable elements 24 to the chassis A so that the movements of the chassis A incident to uneven riding or jolting of the truck provide for a corresponding up and down movement of the sills 21 and by virtue of the sills 16 being movable toward and away from the respective sills 21 under the influence of weight put on or taken off of the bottom 13 of the truck 14 there is consequent play between the respective upper and lower sills on opposite sides of the vehicle.

The upper face of each lower sill 21 is provided with a longitudinal recess 25 extending throughout the length thereof and preferably of the same formation as the longitudinal recess 18 in the respective upper sills 16 and preferably disposed in vertical alinement with the latter. In the seats thus formed in the upper and lower sills 16 and 21 on each side of the truck I dispose rubber or other compressible, yieldable or resilient elements 26 which extend throughout the length of the respective sills. These resilient elements 26 each has a relatively small bore 27 which renders the same hollow without rendering the material thin between the bore and the outer circumference.

Caps, plugs or other suitable elements may be employed to effectively close the outer ends of the compressible elements 26 in order to prevent escape of incompressible fluid which these compressible elements 26 are adapted to contain for purposes presently understood. The fluid may be air or liquid and in any event of such nature as not to have an injurious effect on the compressible elements 26 as would tend to deteriorate or impair the life thereof. The compressible elements 26 are inclosed and thereby protected from the weather by reason of their location between the sills and said plates 19 and also by the end plates 19'.

It will thus be understood that there is interposed between the chassis A and the bottom 13 of the truck certain elements, which, by virtue of their construction and arrangement, serve for one purpose, to absorb shocks between the chassis and the truck body in the event of the vehicle striking obstructions or running over uneven road surfaces, performing this function whether or not the compressible elements 26 contain fluid because of the thickness of the material between the bores and the outer circumference of the compressible elements. This cushioning or shock absorbing structure interposed as described, however, has for its main purpose the performance of another function, that is, to operate through other instrumentalities associated therewith to indicate underloading and overloading of the vehicle. To this latter end metallic piping or flexible tubes 29 may be connected by means of suitable couplings 30 to the inner ends of the compressible elements 26. These pipe or flexible hose connections 29 are connected by means of suitable couplings 31 with a fluid reservoir 32 located preferably near the front of the chassis. This reservoir 32 has pipe or other connection with a low pressure gage 34 of any suitable character mounted preferably on the dash 12 of the vehicle in sight of the driver of the truck. The fluid capacity of this reservoir 32 may be adjusted or varied, as desired, by means of a piston 35 mounted therein and provided with a screw threaded or other stem 36 which extends through one end of the reservoir. This screw threaded stem is provided with a hand wheel or the like 37 which has openings therein. Extending from the reservoir 35 is an arm 38 provided in its outer end with an aperture 39 through which and one of the openings of the hand wheel 37 a seal 40 may be inserted for the purpose of locking the piston 35 in adjusted positions against manipulation and consequent adjustment by unauthorized persons. Any other suitable means for locking the piston 35 against unauthorized adjustment may be employed.

Thus the indicating means is actuated by one or more fluid containing operating members interposed between the body or other load carrying member and the chassis or any other suitable lower member, the fluid containing operating member or members being compressible to varying degrees according to the loads placed on the body or other load carrying member to operate the indicating means and, the same being also capable of supporting the body or the load carrying member under the same varying degrees of compression incident to varying loads in the absence of fluid therein. In other words, the fluid containing operating compressible member or members interposed between the said upper and lower members are constructed so that without fluid therein they cushion and support the body to the same extent and in the same way as in the presence of the fluid. With the fluid in the compressible members 26 compression of the latter causes the fluid therein and also the fluid in the tubular members 29, the reservoir 32, and the pipe connection 33, to operate the Bourbon tube 41 in the gage 34 which effects actuation of the segmental gear 42 on its pivot 43. This segmental gear 42 is in mesh with the pinion 44 on the indicator hand shaft 45, and when it swings it causes the shaft 45 to rotate, and consequently shift the hand 46 over the dial face 47 of the gage 34 and thereby indicate on the dial face the total pounds or amount of load in units as the load is placed on the truck. The dial of the gage gives the rated capacity, say for instance, 3,000 pounds, although it is preferably graduated to indicate a greater rate of pounds capacity, as shown. It also discloses a "zero" point and a "no load test point". The hand indicator 46 should always point to this "no load test point" when the truck is unloaded.

It will be noted that the walls of the recesses in the sills 16 and 21 almost completely embrace the compressible members 26 and that incident to relative movements of the sills toward each other undue lateral expansion of the compressible members is avoided. This is due to said recesses in the sills reinforcing the sides of the compressible members. The opposing inner faces of the sills on opposite sides of their recesses, upon coming together, limit and prevent further compression of the compressible members. This degree of compression is also limited by engagement of the bolts 22 with the upper ends of the slots 23 in the plates 19 or the bolts 22 and the slots 23 may coact with the opposing inner faces of the sills in the performance of this function. The main object of preventing or limiting the degree of compression of the compressible members beyond a predetermined point is to obviate undue stress and wear on the compressible members, the latter being constructed as to need but slight compression to effect practical operation of my appliance.

There is maintained at all times an initial pressure on the system for should there be any leakage the indicator hand would drop below the "no load test point" toward the "zero" point. Should there be an extra amount of pressure from some cause or other, the hand 46 would go above the "no load test point". The aforesaid adjustable reservoir 32 is provided for the purpose of adjusting the hand indicator so as to maintain the indicator hand pointing directly to the "no load test point" when the truck is unloaded. It might be mentioned at this point, for example, that if the truck has been loaded with 3,000 pounds to be carried to a certain point and then 1,000 pounds is removed from the truck, the indicator hand 46 will drop back to the 2,000 pound mark. Then, if the truck is sent to another place and it has 600 pounds taken on, the indicator hand 46 will then indicate 2,600 pounds. The additional 600 pounds and all loads taken on would be registered on a registering means including rotatable disks 48, held against backward movement, preferably by ratchets 48'. The said disks 48 are shifted in any well known manner, they being shown as mounted on a shaft 48$^a$ having a beveled pinion 48$^b$ in mesh with a gear 67 fixed on the hand indicator shaft 45 whereby rotative movement of the shaft 45 operates the shaft 48$^a$, causing operation of the disks 48. Should the truck be overloaded above a predetermined amount, say for instance, 1,000 pounds overload, which would cause the hand indicator 46 to indicate 4,000 pounds on the dial, this act of overloading would be registered on a register, including rotatable disks 49, held against backward movement by ratchets 48''. One way in which the times the truck has been overloaded may be indicated, is to provide the aforesaid beveled gear 67 with a projection or other tripping element 66 which is so disposed that when the gear 67 has been rotated to such an extent as to cause the indicator hand 46 to pass the predetermined amount of overload, as shown on dial 47, the trip 66 will engage the star wheel 66' and actuate the register mechanism 49, indicating thereon the number of times the truck has been overloaded. If desired, the beveled gear may have a plurality of screw-threaded holes 67' on its periphery so that the screw threaded tripping element 66 may be disposed therein interchangeably whereby the trip will engage the star wheel 66' at different times according to the hole in which the trip is placed, whereby the amount of overload to be reached and indicated may be adjusted. By means of the ratchets 48' the registering disks turn in one direction only under the action of registering the loads and cannot accidentally rotate backward.

A T-coupling 50 may be disposed in the line of the tubular connection 33 between the reservoir 32 and the gage 34. A pipe 51 has connection with this T-coupling 50 and with one end of a cylinder 52 which contains means operable under the influence of fluid pressure to operate means in the intake manifold 53 of the engine of the truck to automatically cut off the supply of gas to the cylinders of the engine in the event that the truck is overloaded and thereby prevent operation of the engine and a consequent movement of the truck. For instance, to accomplish this in one way there is disposed in the manifold pipe 53 a butterfly valve 54 which has a shaft 55 journaled through the side of said cylinder 52, and to which shaft 55, and located within said cylinder 52 is a pinion 56 which is adapted to mesh with a rack 57 secured at one of its ends to a piston 58 which is slidable in the cylinder 52 under the action of fluid pressure entering the cylinder from said pipe 51. The other end of the rack 57 is secured to a disk 59, interposed between which latter and a disk 60 is a spring 61. The fluid pressure against the piston 58 acts against the tension of this spring 61 to cause the butterfly valve 54 to close the manifold intake pipe 51, thereby shutting off the supply of gas to the engine and preventing movement of the truck under the influence of operation of the motor.

The tension of the spring 61 may be increased or diminished by adjustment of the disk 60 toward and away from the disk 59, there being secured to the disk 60 a screw-threaded rod 62 which operates through a screw-threaded bore in the adjacent end of the cylinder 52. On the outer end of the screw threaded rod 62 is a hand wheel 63. The object of this arrangement is for the purpose of adjusting the predetermined amount of overload that may be placed on the truck which will operate to cut off the supply of gas to the engine. On the cylinder 52 is an arm 64 provided with an aperture through which and the hand wheel 63 a seal 65 may be passed to prevent unauthorized manipulation or adjustment of the disk 60. Any other locking means may be employed for the purpose.

From the foregoing it will be apparent that the capacity of the truck may be varied and that the weight on the truck, incident to the materials or commodities placed thereon or removed therefrom will be indicated on the dial 47 of the gage 34. If the truck has a load capacity of, say for instance, 3,000 pounds, it will be apparent to the driver or other attendant when the maximum load capacity of the vehicle has been reached and if the driver or attendant disregards the indication or warning that the maximum load capacity has been reached, the butterfly valve 54 will be operated at the proper time to cut off the gas supply to be engine so that the driver or other attendant cannot run the vehicle in an overloaded condition. This overloading of the vehicle not only prevents movement of the vehicle, but the fact that the vehicle has been overloaded, is indicated by the mechanism 49.

What is claimed is:—

1. The combination with a chassis and a vehicle body, of a load indicator comprising fluid-operated indicating means and fluid containing, compressible, operating, members interposed between the chassis and the body, said members having walls formed of a thickness to support the body in spaced relation to the chassis in the absence of fluid in said members.

2. The combination with an upper load carrying member and a lower member, of a fluid-operated load indicating means, and a fluid containing, operating, compressible, load supporting member interposed between said upper and lower members, said supporting member having walls constructed to support the load independently of the presence of fluid therein.

3. The combination with a vehicle chassis and a body, of upper and lower sills interposed between the body and the chassis, fluid pressure containing elements interposed between and lying in engagement with the sills and which are compressible under the influence of weight placed on the body, a gage carried by the vehicle and connections between said fluid containing elements and the gage whereby the weight placed upon the body may be indicated.

4. The combination with a chassis and a vehicle body, of a load indicator comprising indicating means and an operatively compressible supporting member interposed between the chassis and the body and constructed to contain an incompressible liquid, said member having walls formed of a thickness to support the body in spaced relation to the chassis independently of the presence of liquid in said member.

5. The combination with a vehicle chassis and a body, of upper and lower longitudinally disposed sills interposed between the body and the chassis on opposite sides thereof, tubular fluid pressure containing members interposed between the sills on opposite sides of the vehicle and which are compressible under the influence of weight placed on the body, a gage carried by the vehicle, and connections between said tubular members and the gage whereby the weight placed upon the body may be indicated.

6. In a vehicle including a chassis frame and a resiliently supported body, a fluid pressure means independent of the resilient body supporting means to yieldingly support the body and operable by the relative movement between the body and the chassis frame, the fluid pressure means being arranged above the resilient body supporting means, and a gage operated by the fluid pressure to indicate the amount of said movements.

7. The combination with a chassis and a vehicle body, of a load indicator comprising a fluid operated load indicating means and a fluid containing operating member interposed between the chassis and the body and connected to the load indicating means and operable to varying degrees of compression according to loads placed on the body to operate the indicating means, said member being capable of supporting the body under the same varying degrees of compression as aforesaid incident to varying loads in the absence of fluid in said member.

8. In a vehicle including a chassis frame and a body, relatively long compressible fluid containing members disposed between the chassis frame and the body along opposite sides thereof and arranged longitudinally of the same, a gage on the vehicle, and connections between said compressible members and the gage whereby the gage is operated under the influence of weight placed on said body.

9. In a vehicle, a chassis frame and a body, means below the chassis frame to yieldably support the frame and body, means interposed between the frame and body to yieldably support the body on the frame and including a fluid containing member, a gage, and connections between said means and the gage to operate the latter upon weight being placed on the body.

10. In a vehicle, a chassis frame and a body, means below the chassis frame to yieldably support the frame and body, means interposed between the frame and body to yieldably support the body on the frame and including a fluid containing member, a gage, and connections between said means and the gage to operate the latter upon weight being placed on the body, the body being supported by said means independently of the fluid.

11. In a vehicle, a chassis frame and a body, means interposed between the frame and body to yieldably support the body on the frame and including a fluid containing member, a gage, connections between said means and the gage to operate the latter upon weight being placed on the body, and means carried by the vehicle for varying the fluid capacity of said fluid containing member.

12. In a vehicle, a chassis frame and a body, means interposed between the frame and body to yieldably support the body on the frame and including a fluid containing member, a gage, and connections between said means and the gage to operate the latter upon weight being placed on the body, the body being supported by said means independently of the fluid, and means carried by the vehicle for varying the fluid capacity of said fluid containing member.

13. The combination of a vehicle body and a chassis frame, coöperating pairs of sills interposed between the chassis frame and the body, each pair of sills being arranged longitudinally of the chassis frame and body, yieldable means arranged between each pair of sills, a gage carried by the vehicle, and connections between the yieldable means and the gage to operate the latter under the influence of weight placed on said body.

14. The combination of a body, sills secured to the underside of the body, a sill supported under each of the aforesaid sills for coöperation with the first-named sills, yieldable means arranged between the coöperating sills and maintaining the coöperating sills normally spaced apart, said yieldable means adapted to contain a fluid, a gage, and fluid containing and conveying connections between the yieldable means and the gage to operate the latter upon compression of said yieldable means incident to weight placed on the body.

15. The combination of a vehicle including a chassis frame and a body including a driver's seat, means arranged between the chassis frame and the body and extending from the rear of the driver's seat to the rear of the body to cushion the latter, said means including a fluid containing member, a gage on the vehicle and fluid containing and conveying connections between said cushioning means and the gage to operate the latter upon downward movement of the body against said cushioning means incident to weight placed on the body.

16. The combination of a vehicle including a chassis frame and a body including a driver's seat, means arranged between the chassis frame and the body and extending from the rear of the driver's seat to the rear of the body to cushion the latter, said means including a fluid containing member, a gage on the vehicle and fluid containing and conveying connections between said cushioning means and the gage to operate the latter upon downward movement of the body against said cushioning means incident to weight placed on the body, the body being cushioned by said cushioning means independently of the fluid.

17. The combination with a vehicle chassis and a body, of compressible fluid containing members interposed between the chassis and the body, a gage, fluid containing and conveying connections between the compressible members and the gage, and means carried by the vehicle and located permanently in the fluid containing and conveying connections for varying the fluid capacity of said compressible elements and connections therebetween and the gage.

18. The combination with a chassis and a vehicle body, of a load indicator comprising fluid operated indicating means and a plurality of fluid containing compressible operating members arranged between the chassis and the body and connected to the indicating means to operate the latter, said members having walls constructed to support the body in operative position on the chassis independently of the presence of fluid therein.

19. The combination of a vehicle chassis and a body, of fluid pressure means interposed between the chassis and the body, means having operative connection with said fluid pressure means to indicate when the weight capacity of the vehicle has been reached, and means operatively connected with the indicating means and influenced in operation by the fluid pressure from said fluid pressure means to indicate the number of times the vehicle has been overloaded.

20. The combination of a vehicle chassis and a body, upper and lower sills interposed between the chassis and the body, a fluid pressure containing member interposed between the sills and composed of resilient material having a relatively small bore, the thickness of the material between the bore and the surface of the fluid containing member being greater than the diameter of said bore, the fluid pressure containing member being compressible under the influence of weight placed on the body, a gage carried by the vehicle, and connections between said fluid containing member and the gage whereby the weight placed on the body may be indicated on the gage.

21. The combination of a vehicle chassis and a body, upper and lower sills interposed between the chassis and the body, a fluid pressure containing member interposed between the sills and composed of resilient material having a relatively small bore, the thickness of the material between the bore and the surface of the fluid containing member being greater than the diameter of said bore, the fluid pressure containing member being compressible under the influence of weight placed on the body, a gage carried by the vehicle, connections between said fluid containing member and the gage whereby the weight placed on the body may be indicated on the gage, and means operable to indicate the number of times the vehicle has been overloaded.

22. The combination of a vehicle chassis and a body, a fluid pressure containing member interposed between the chassis and the body and having a relatively small bore arranged centrally thereof, the thickness of the material between the bore and the surface of the fluid pressure containing member being greater than the diameter of said bore, the fluid pressure containing member being compressible under the influence of weight placed on the body, means inclosing the fluid pressure containing member, a gage carried by the vehicle, and connections between said fluid containing member and the gage whereby the weight placed on the body may be indicated on the gage.

23. The combination of a vehicle chassis and a body, a fluid pressure containing member interposed between the chassis and the body and having a relatively small bore arranged centrally thereof, the thickness of the material between the bore and the surface of the fluid pressure containing element being greater than the diameter of the bore, the fluid pressure containing member being compressible under the influence of weight placed on the body, a gage carried by the vehicle, and connections between said fluid containing member and the gage whereby the weight placed on the body may be indicated on the gage.

24. The combination of a vehicle chassis and a body, a fluid containing member interposed between the chassis and the body and having a relatively small bore therein, the fluid containing member being compressible under the influence of weight placed on the body, a gage carried by the vehicle, and connections between the fluid pressure containing member and the gage whereby the weight placed on the body may be indicated on the gage.

25. The combination with a vehicle chassis and a body, of fluid pressure containing members interposed between the chassis and body on opposite sides of the vehicle and which are compressible under the influence of weight placed on the body, each fluid pressure containing member having a relatively small bore, a gage carried by the vehicle, and connections between said fluid pressure containing member and the gage whereby the weight placed upon the body may be indicated.

26. The combination with a vehicle chassis and a body, a fluid pressure containing member interposed between the chassis and the body and which is compressible under the influence of weight placed on the body, and which has a relatively small bore therein, a gage carried by the vehicle, and connections between said fluid pressure containing member and the gage whereby the weight placed on the body may be indicated, the fluid pressure containing member being so constructed and having its bore so arranged that the full weight capacity of the vehicle may be indicated upon a relatively slight compression of the fluid pressure containing member.

27. The combination with a vehicle chassis and a body, a fluid pressure containing member interposed between the chassis and the body and which is compressible under the influence of weight placed on the body, and which has a relatively small bore therein, a gage carried by the vehicle, and connections between said fluid pressure containing member and the gage whereby the weight placed on the body may be indicated, the fluid pressure containing member being so constructed and having its bore so arranged that the full weight capacity of the vehicle may be indicated upon a relatively slight compression of the fluid pressure containing member and means coacting with the gage to indicate the number of times the vehicle has been overloaded, said overload indicating means being actuated under the influence of said fluid pressure containing member.

28. The combination with a vehicle chassis and a body, a fluid pressure containing member interposed between the chassis and the body and which is compressible under the influence of weight placed on the body, and which has a relatively small bore therein, a gage carried by the vehicle, and connections between said fluid pressure containing member and the gage whereby the weight placed on the body may be indicated, the fluid pressure containing member being so constructed and having its bore so arranged that the full weight capacity of the vehicle may be indicated upon a relatively slight compression of the fluid pressure containing member, and means for inclosing the fluid pressure containing member.

29. The combination with a chassis and a vehicle body, of a load indicator comprising indicating means and a fluid-containing compressible operating member interposed between the chassis and the body, said member having walls constructed to support the body in operative position on the chassis in the absence of fluid in said member, and means for inclosing said compressible operating member.

30. The combination with a vehicle chassis and a body, of a fluid pressure means interposed between the chassis and the body, means having operative connection with said fluid pressure means to indicate when the weight capacity of the vehicle has been reached, and means operatively connected to the indicating means and operated by the fluid pressure means to indicate the total weight carried by the vehicle.

31. The combination with a vehicle chassis and a body, of a fluid pressure means interposed between the chassis and the body, means having operative connection with said fluid pressure means to indicate when the weight capacity of the vehicle has been reached, means operatively connected to the indicating means and operated by the fluid pressure means to indicate the total weight carried by the vehicle, and means operatively connected to the indicating means and operated by the fluid pressure means to indicate the number of times the vehicle has been overloaded.

32. The combination with a chassis and a vehicle body, of an indicating means including a device to indicate when the weight capacity of the vehicle has been reached, a device to indicate the total weight carried by the vehicle and a device to indicate the number of times the vehicle is overloaded, and a fluid containing, compressible member interposed between the chassis and body to operate said indicating means.

33. The combination with a chassis and a vehicle body, of an indicating means including a device to indicate when the weight capacity of the vehicle has been reached, a device to indicate the total weight carried by the vehicle and a device to indicate the number of times the vehicle is overloaded, and a fluid containing, compressible member interposed between the chassis and body to operate said indicating means, said member constructed to support the body independently of the presence of fluid therein.

34. The combination with a vehicle chassis and a body, of upper and lower sills interposed between the body and the chassis, the opposing inner faces of the sills having recesses, fluid containing members interposed between and lying in engagement with the recesses in the sills and compressible under the influence of weight placed on the body, a low pressure gage carried by the vehicle, and connections between said fluid containing member and the gage whereby the weight placed upon the body may be indicated.

35. In a load indicator, the combination of a chassis, a vehicle body, an indicating means including a compressible body-supporting member disposed between the chassis and vehicle body, and means controlled by said compressible member for actuating the indicating means.

36. In a load indicator, the combination of a chassis, a vehicle body, an indicating means having as one element thereof a fluid-containing, compressible, body-supporting member disposed between the chassis and the vehicle body and constructed to adequately support the vehicle body independently of operative connection with the indicating means.

37. In a load indicator, the combination of a chassis, a vehicle body, an indicating means having as one element thereof a fluid-containing, compressible, body-supporting member disposed between the chassis and the vehicle body and constructed to adequately support the vehicle body independently of operative connection with the indicating means, and means controlled by said member for actuating the indicating means.

38. The combination with a chassis and a vehicle body, of a load indicator comprising an indicating means, and means to operate the indicating means according to loads placed on the body, including a member formed of compressible material disposed between the chassis and the body and whose walls are constructed to support the body yieldably in normal operative position on the chassis independently of operative connection with the indicating means.

39. The combination with a chassis and a vehicle body, of a load indicator comprising an indicating means, and means to operate the indicating means according to loads placed on the body, including a member formed of compressible material disposed between the chassis and the body and constructed to support the body yieldably in normal operative position on the chassis independently of operative connection with the indicating means.

40. The combination of a vehicle chassis and a body, upper and lower members interposed between the chassis and the body, said members being movable relative to each other and having opposing recesses in their inner faces, an indicating means on the vehicle, means to operate the indicating means including a compressible member interposed between said upper and lower members and located in and almost completely embraced by said recesses of the upper and lower members, and means whereby the degree of compression of said compressible member is limited beyond a predetermined point, said compressible member being constructed to yieldably support the body independently of the presence of fluid therein.

41. The combination of an upper member and a lower member, an indicating means, means connected to the indicating means to operate the latter including a compressible member constructed to yieldably support said upper member over said lower member, and means interposed between said upper and lower members for the support of said compressible member and constructed whereby the degree of compression of the compressible member is limited, said compressible member being constructed to yieldably support the upper member independently of the presence of fluid therein.

42. The combination of an upper load carrying member and a lower member, a fluid operated load indicating means, and a fluid containing, operating, compressible member interposed between said upper and lower members to yieldably support said upper member and to operate said indicating means, said compressible member being constructed to yieldably support the upper member independently of the presence of fluid therein.

43. The combination of an upper load carrying member and a lower member, a fluid operated load indicating means, upper and lower sills interposed between said members, the opposing faces of the sills having recesses, and a fluid containing, operating, compressible member interposed between said sills and located in the recesses of the latter and compressible under the influence of weight placed on the upper member to actuate the indicating means, said compressible member being constructed to yieldably support the upper member independently of the presence of fluid therein.

In testimony whereof I affix my signature in presence of two witnesses.

FREDERICK J. TROLL.

Witnesses:
JOHN H. SIGGERS,
GEO. C. SHOEMAKER.